United States Patent [19]

Chethik

[11] 4,280,224
[45] Jul. 21, 1981

[54] BIT SYNCHRONIZER WITH EARLY AND LATE GATING

[75] Inventor: Frank Chethik, Palo Alto, Calif.

[73] Assignee: Ford Aerospace & Communications Corporation, Detroit, Mich.

[21] Appl. No.: 50,566

[22] Filed: Jun. 21, 1979

[51] Int. Cl.³ .......................... H04L 5/22; H03K 5/00
[52] U.S. Cl. .................................. 375/116; 328/164; 375/95
[58] Field of Search .......................... 178/69 A, 69 R; 328/162, 163, 164; 375/106, 119, 111, 109, 112, 120, 116, 85, 39, 55, 82, 95

[56] References Cited

U.S. PATENT DOCUMENTS

| | | | |
|---|---|---|---|
| 3,238,459 | 3/1966 | Landee | 375/85 |
| 3,278,684 | 10/1966 | Geraghty et al. | 178/69 R |
| 3,289,082 | 11/1966 | Shumate | 375/39 |
| 3,401,339 | 9/1968 | Kluever et al. | 375/55 |
| 3,482,044 | 12/1969 | Kaneko | 375/116 |
| 3,491,202 | 1/1970 | Bailey et al. | 375/116 |
| 3,514,702 | 5/1970 | Nahay et al. | 375/82 |
| 3,671,875 | 6/1972 | Pento | 328/164 |
| 3,772,600 | 11/1973 | Natali | 375/95 |
| 3,781,696 | 12/1973 | VanLoon et al. | 328/164 |
| 4,105,979 | 8/1978 | Kage | 328/164 |

Primary Examiner—Thomas A. Robinson
Attorney, Agent, or Firm—Edward J. Radlo; Clifford L. Sadler

[57] ABSTRACT

This device generates clock pulses which are synchronized with the bit data rate of an input antipodal bit pattern. The device can be used with multiple input data channels whenever such channels are synchronized, i.e., the periodicity of each channel is the same and the phase relationship between channels is fixed. For example, it can be used with QPSK modulation with two input basebands; or with biphase shift keying, frequency shift keying, or other types of modulation with only one baseband input. The circuit uses a form of delay lock loop which estimates the mean zero crossing instant of the input data stream. It compares the zero crossings with early and late gates which are generated on the basis of prior analysis of the input stream. A multiple transition detector circuit is employed when the operating environment is very noisy to inhibit the counting of multiple zero crossings during a combined early gate/late gate period.

9 Claims, 6 Drawing Figures

BIT SYNCHRONIZER WITH EARLY AND LATE GATING

BACKGROUND OF THE INVENTION

1. Field of the Invention

This invention is a device for synchronizing an input data stream which consists of an antipodal pattern, i.e., where the data has one of two states which can be represented as values above and below a reference axis. Thus, the device has applicability in biphase shift keying and frequency shift keying receivers. It can also be used with multiple input streams when such streams are synchronized, e.g., in QPSK modulated signals.

2. Description of the Prior Art A prior art search was conducted but uncovered no patents for bit synchronizers using early and late gating and the use of an up/down counter as a statistical averager, as in the present invention.

SUMMARY OF THE INVENTION

The demodulated and prefiltered input signal is run through a sign sense amplifier, a pulse generator, a pair of AND gates, to an up/down counter, to a digital-/analog converter, to a lead network, to a voltage controlled oscillator and to pulse phase logic which creates early and late clock pulses that are fed into said AND gates to create early and late gates. The early gate corresponds to a time just before the mean zero crossing instant of the data stream, i.e., the average point in the bit period at which the signal crosses the reference axis. The late gate corresponds to a period of time in the bit cycle starting with the mean zero crossing and ending a pulse width later. The width of the pulse as a function of the bit period is preselected. The result is that the rate of clock pulses will correspond to the mean value of the bit period, i.e., the length of time required to denote a "one" state or "zero" state.

Optional circuit means are employed to inhibit overflow in the up/down counter and to inhibit the counting of zero crossings when there is other than a single zero crossing in a combined early gate/late gate period.

The device can also be used to synchronize pulses from more than one input data stream when said streams are synchronized, i.e., they have the same periodicity and a fixed phase between individual streams. In such case, the front end of the circuit, i.e., the sign sense amplifier, the pulse generator, and pair of AND gates, is duplicated for each input stream and is combined using OR gates with the front ends for the other input streams.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENTS

Figure 1:
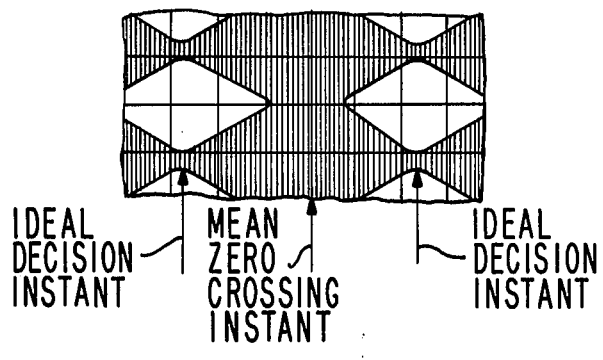
FIG. 1 is an "eye" pattern for a typical antipodal input stream, i.e., a time-superimposition of many pieces of the input stream.

FIG. 1 is an "eye" pattern of a typical input data stream which the present invention is capable of synchronizing. This eye pattern is a result of a superimposition, e.g., on an oscilloscope, of many pieces of the input data stream amplitude as a function of time, each piece being two bit periods long. The shaded areas represent places where signals have been present at any time during the sampling period. In this case, the input data stream is in the form of a band-limited binary waveform such as might be received from the output of a band-limited communications medium. However, it must be remembered that the present invention can be utilized for any antipodal pattern, i.e., one in which the information in the data stream is represented as either a positive value (logical "one") or a negative value (logical "zero") about a reference axis.

The left half of FIG. 1 represents nearly one bit period and the second half of FIG. 1 represents nearly a second bit period. In each case, it is seen that the bit period is represented by many occurrences of a "one" at that instant and many occurrences of a "zero". The ideal point within each bit period for making a decision as to whether the particular bit is a "one" or "zero" is seen to be that point which is exactly half way into the bit period, for it is here that the character of the bit is most sharply delineated, as evidenced in FIG. 1 by a narrow band of tracings on the oscilloscope. It is also seen from FIG. 1 that the exact zero crossing instant (i.e., that instant when the data goes from a "zero" state to a "one" state or vice versa) varies somewhat due to the vagaries of the propagation medium. This variance is represented on FIG. 1 as a broadening of the tracings on the oscilloscope. The present invention statistically estimates the mean or average zero crossing instant.

It is to be noted that a zero crossing does not necessarily occur between every two bits since the data could arrive at the receiver as a succession of ones or a succession of zeros before changing state in crossing the zero, or reference, axis.

Figure 2:
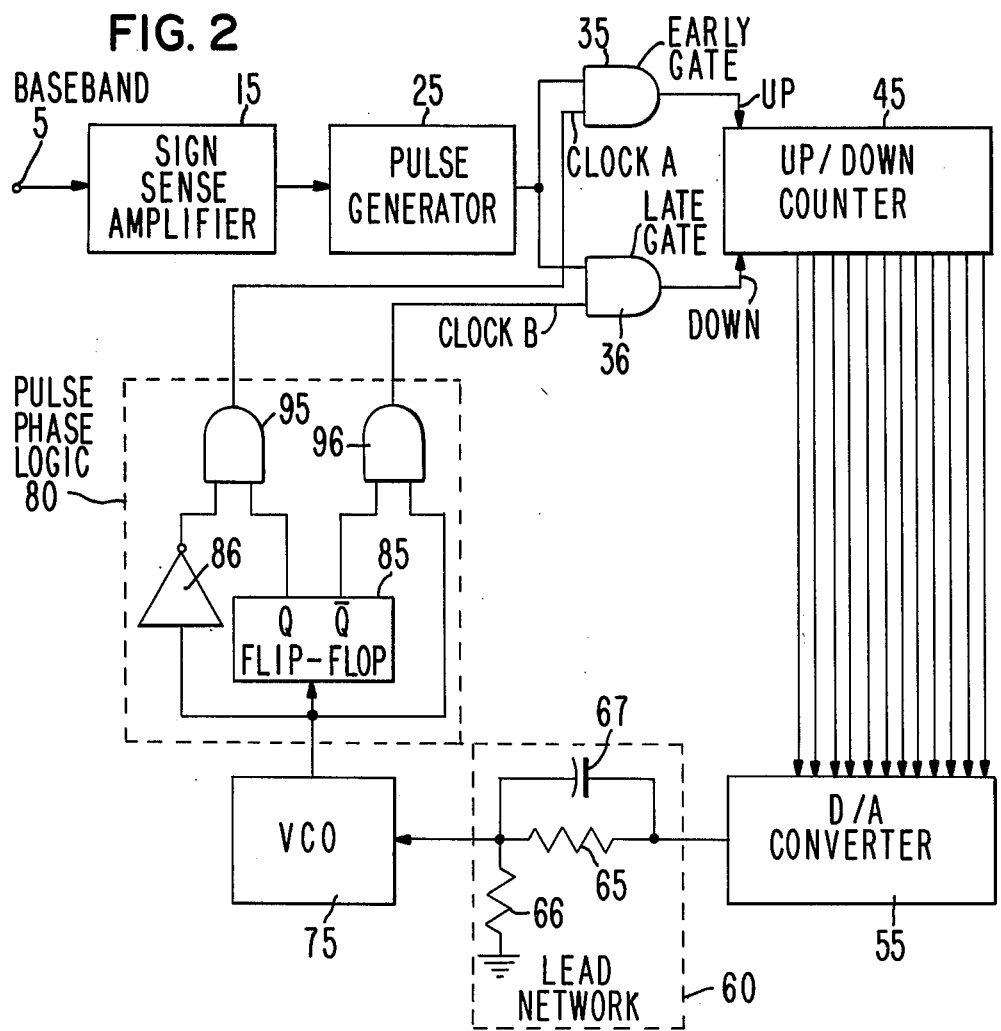
FIG. 2 is a schematic drawing of an embodiment of the present invention usable for a single input stream.

FIG. 2 is a schematic drawing of an embodiment of the invention which is usable with a single input data stream. The demodulated and prefiltered input signal, which can be represented as a voltage, is applied at terminal 5. This is referred to as the baseband signal. This is fed to the input of sign sense amplifier 15. This can be an operational amplifier or a Schmitt trigger. Amplifier 15 creates a binary waveform from the input analog signal. If the signal is anything positive, the output of amplifier 15 will be at a constant high or "1" level. If the input is anything negative, the output of amplifier 15 will be a constant low or "0" level. The signal is then fed to pulse generator 25, which is a monostable multivibrator that trips on a changing state, either a 1 to a 0 or a 0 to a 1. If monostable multivibrators are employed which trip only on a unidirectional changing state, two such multivibrators can be OR-ed together to accomplish this function. Pulse generator 25 produces an output pulse which is arbitrarily short but long enough to trip counter 45. The pulses are fed as a first input to each of AND gates 35 and 36.

Figure 3:
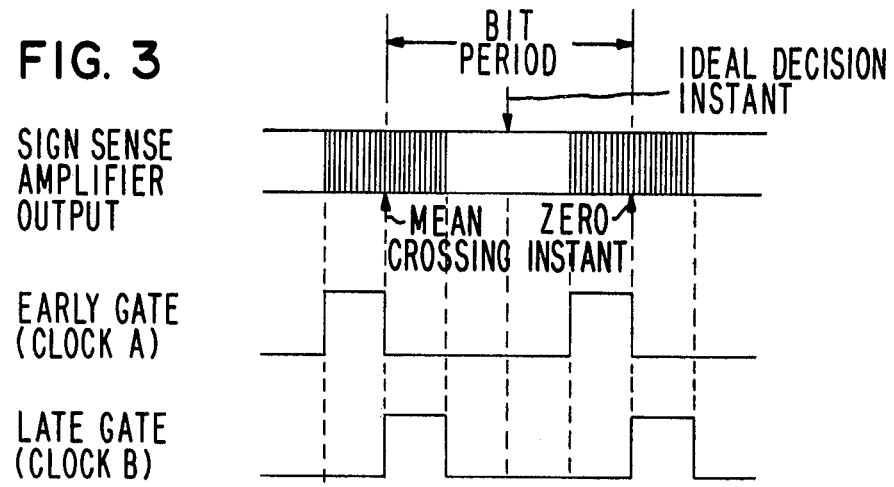
FIG. 3 is a set of waveforms of the early and late gates of FIG. 2 as a function of the mean zero crossing of the input stream.

These pulses are segregated by AND gates 35 and 36 respectively into two groups. The first corresponds to zero crossings which occur in an early gate period, which in the preferred embodiment shown begins 25% of a bit period before the mean zero crossing instant and ends at the mean zero crossing instant. See FIG. 3 for a depiction of this and other time relationships.

The late gate, which is controlled by AND gate 36, corresponds to zero crossings which occur during an interval of time beginning with the mean zero crossing instant and terminating, in the preferred embodiment shown, 25% of a bit period later. The 25% figure is arbitrary and is simply that figure which is used in the preferred embodiment. The actual percentage is determined by the width of the pulses, which are denominated clock A corresponding to the early gate and clock B corresponding to the late gate, and which are fed as second inputs to AND gates 35 and 36, respectively. The output signals from AND gate 35 are fed to the "up" input terminal of up-down counter 45, which in the preferred embodiment is a modulo 4096 up-down counter. Similarly, the output signals from AND gate 36 are fed into the "down" input terminal of counter 45. The counter keeps a running total of the relative number of up or early gate crossings with respect to the number of down or late gate crossings. The counter has a maximum capacity of 4095 and thus can average over many zero crossings in the data. If this count should ever be exceeded, then the value outputted by the counter would revert to the actual number modulo 4096. The counter function can be visualized as an integrator in the delay lock loop of the present circuit.

The output of counter 45 is a set of 12 wires, which is necessary to convey a binary signal representative of a digital number from 0 to 4095. The value accumulated by the counter is continuously sent in binary form over these wires to digital-to-analog converter 55, which converts this value to an analog voltage.

The output from digital/analog converter 55 is fed through lead network 60 to voltage controlled oscillator 75, whose input range has been selected to be compatible with the output range of converter 55.

The lead network is necessary because counter 45 and VCO 75 are each integrators. Thus, the lead network is necessary to provide a phase margin to establish nearly critical damping. The lead network comprises resistor 65 connected in series between converter 55 and VCO 75, capacitor 67 connected in parallel with resistor 65, and resistor 66 which is connected between the input of VCO 75 and ground. The lead network puts higher frequency signals through faster than lower frequency signals.

VCO 75 is selected to run preferably at a harmonic of the output frequency of sense amplifier 15. Typically, it is run at twice said frequency. The output frequency of the VCO is equal to a constant rest frequency plus a quantity equal to the gain of the VCO in hertz per volts times the input voltage applied to the VCO.

This output signal is applied to pulse phase logic 80, which produces the clock A and clock B fed to AND gates 35 and 36. The operation of pulse phase logic 80 can best be seen by reference to FIG. 4, which illustrates the waveforms at various points of this part of the circuit.

Figure 4:
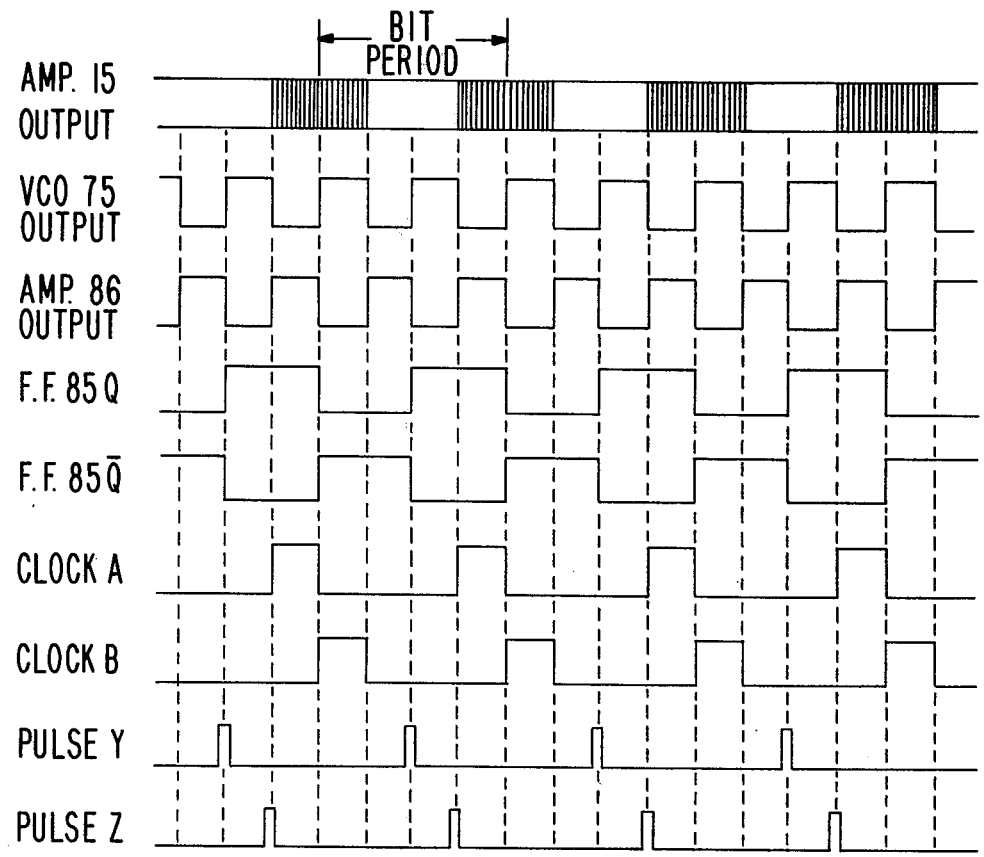
FIG. 4 is a set of waveforms showing the derivation of clock pulses for the circuits shown in FIGS. 2 and 6.

The first waveform of FIG. 4 is a pulseform superimposition representing the input data stream after processing by amplifier 15. The shaded portions of this pulseform represent the occurrences of zero crossings of the input stream, whether the zero crossing be due to a negative-to-positive or a positive-to-negative transition.

The second waveform in FIG. 4 is the output voltage waveform of VCO 75. It is seen that this is a square wave which in this preferred embodiment is running at twice the frequency of the input data, i.e., there are two complete cycles of the VCO output for each bit period of the first pulseform.

This signal is fed to the input terminal of inverting amplifier 86, to the input of divide-by-two flip-flop 85, and to one input terminal of AND gate 96. The output of inverting amplifier 86 is fed to one input terminal of AND gate 95. The Q output of flip-flop 85 is fed to the second input terminal of AND gate 95. The $\overline{Q}$ (inverted Q) terminal of flip-flop 85 signal is fed to the second input terminal of AND gate 96.

It is seen that amplifier 86 inverts the VCO output, i.e. "one" becomes "zero" and "zero" becomes "one".

It is seen that the Q terminal of flip-flop 85 is activated when the input signal to flip-flop 85 changes state from a zero to a one; the signal on the $\overline{Q}$ terminal of flip-flop 85 is the logical inverse of the signal on the Q terminal.

From FIG. 4 it is seen that the output of AND gate 95 is the set of pulses known as clock A, which is fed to an input of AND gate 35. The output of AND gate 96 is a set of pulses denominated clock B and is fed to an input of AND gate 36. These pulses coincide with the early gates and late gates, respectively (compare FIG. 3).

Pulses of different widths can be generated by changing the configuration of pulse phase logic 80.

The operation of the synchronization can be seen by noting that if the input data stream experiences a zero crossing in the early gate period, the up terminal of counter 45 will be pulsed. This will raise the voltage produced by converter 55 and raise the frequency of VCO 75. Thus, the frequencies of clock A and clock B also increase. The result is that at this new increased frequency, the early and late gates will occur earlier on successive VCO output cycles. Thus the zero crossing will occur within a late gate interval. This causes a decrement of counter 45 and a slowing of the clock pulses. Thus, the clock pulses stabilize at a phase which corresponds to the mean zero crossings of the input data stream at the frequency of the input bit rate.

Figure 5:
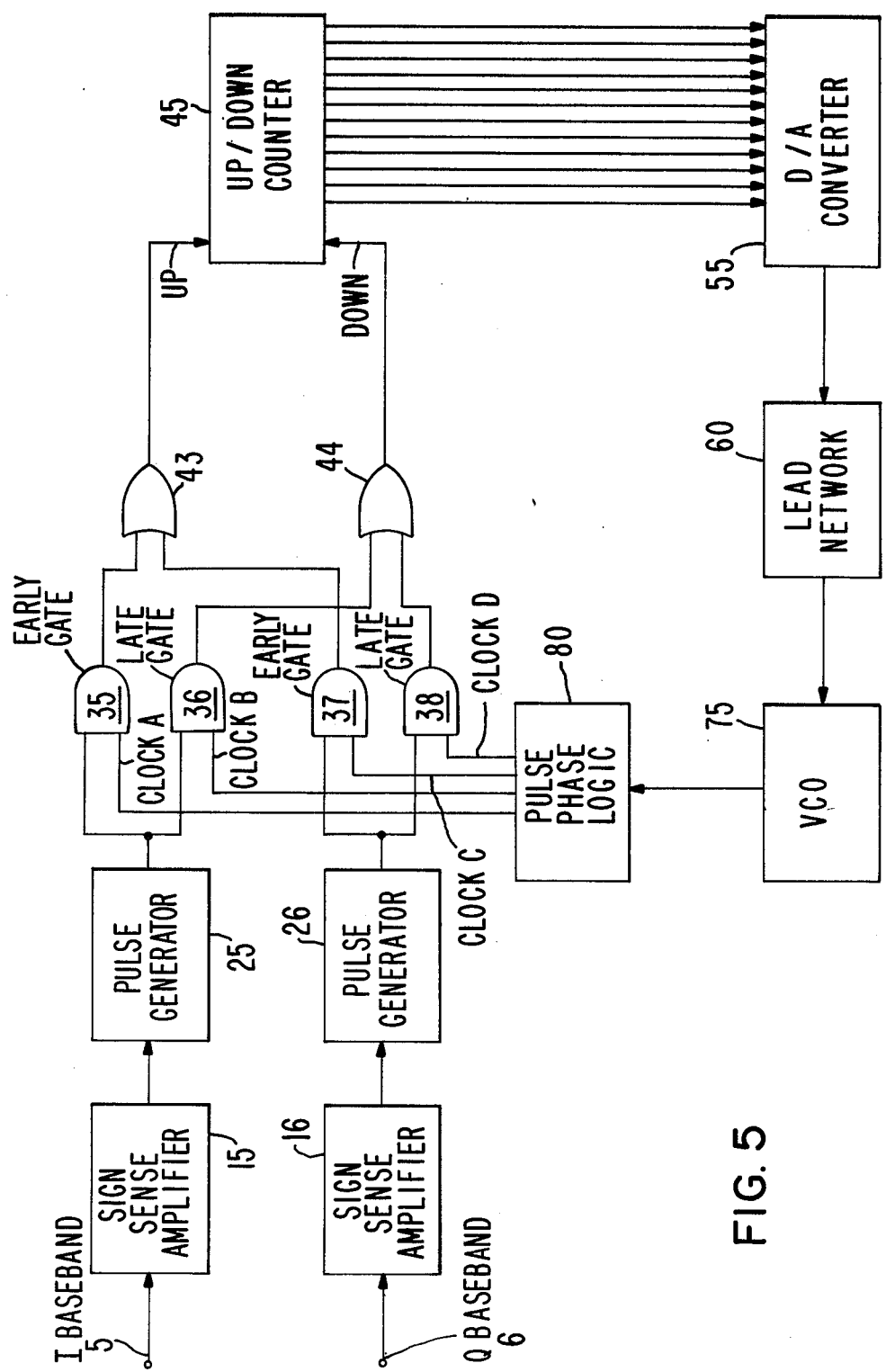
FIG. 5 is a schematic drawing of an embodiment of the invention usable for two synchronized input data streams.

FIG. 5 shows an embodiment of the invention wherein two input data streams are employed, such as in staggered QPSK. This design will work for any two synchronized antipodal data streams, however. The demodulated and prefiltered input baseband signals are applied at terminals 5 and 6 and correspond to the I baseband and Q baseband of the QPSK signal, respectively. The Q baseband is processed similarily to the I baseband of the single data stream embodiment, i.e., sign sense amplifier 16 squares the wave and pulse generator 26 trips on a change of state. AND gate 37 establishes the early gate for the Q baseband and AND gate 38 establishes the late gate. The signals from AND gates 35, 36, 37 and 38 are not fed directly to counter 45. Rather, the outputs of AND gates 35 and 37 are first combined by OR gate 43, whose output is connected to the up terminal of counter 45. Similarly, the outputs of AND gates 36 and 38 are fed to the input of OR gate 44, whose output is fed to the down terminal of counter 45. Because of this connection an early gate zero crossing from either the I baseband or Q baseband will increment counter 45, whereas a late gate zero crossing from either the I baseband or the Q baseband will decrement said counter.

In this case, pulse phase logic 80 is wired to produce four clocks, A, B, C and D, which are fed to AND gates 35, 36, 37 and 38, respectively. Clocks A and C correspond to early gates and clocks B and D correspond to late gates. All clocks run at the same frequency; the phase shifts between clock A and C and between clock B and clock D are equal to each other and to the phase shift between the I baseband and Q baseband input signals. The phase shifting necessary to generate clocks C and D is accomplished by incorporating conventional phase shift logic within pulse phase logic 80.

For synchronous QPSK, in which the I and Q zero-crossings are aligned, it is desirable to insert delays of half a bit period in the lines between gates 37 and 43 and between 38 and 44 to insure separation of the I and Q early gates the late gates.

The invention can similarly function when an arbitrarily large number of input signals are employed. The only requirement is that these signals be synchronized, i.e., they have identical periodicity and fixed phase differences. Each signal is processed by its own front end comprising a sign sense amplifier, pulse generator, and pair of AND gates. All the front end processors are combined by the two OR gates 43 and 44, which separate the early gates from the late gates. The number of clocks produced by pulse phase logic 80 is equal to twice the number of input signals (one clock for an early gate and one clock for a late gate). Each clock operates at the same frequency, and the phase difference between each pair of clocks is equal to the phase difference between corresponding input data streams.

Figure 6:
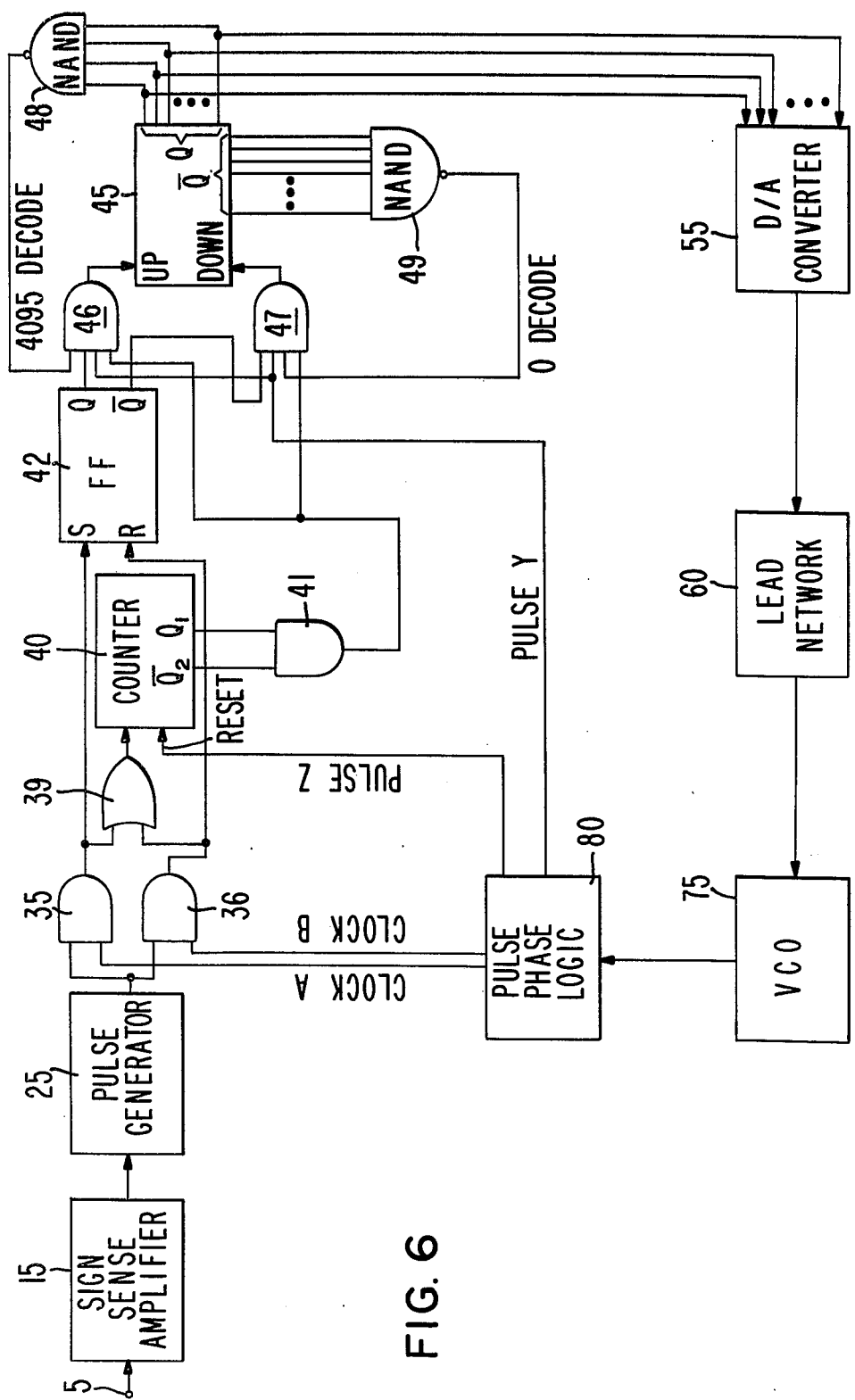
FIG. 6 is a circuit diagram of an overflow inhibitor and multiple-transition detector useful in the present invention.

FIG. 6 is a circuit diagram of some additional features which can prove to be very useful to the operation of the invention.

NAND gates 48 and 49 serve to inhibit overflows within counter 45 as follows: The range of counter 45 is from 0 to 4095 bits. It is desirable to prevent the incrementing of the counter beyond 0 (2047 is taken to be the nominal reference point of the counter), since not doing so would cause a jump in the set of outputs which represent the normal or Q output of counter 45 and which is fed as the input to digital/analog converter 55. The Q outputs are also fed as the set of inputs to 12 input NAND gate 48, whose output is connected as one of the inputs to 4 input AND gate 46. AND gate 46 controls the up input of counter 45. When the count contained in counter 45 becomes 4095, all the Q outputs are logical "ones"; thus, the output from NAND gate 48 becomes a 0, which places a 0 at the output of AND gate 46 regardless of what the other inputs to AND gate 46 are, thus inhibiting the incrementing of counter 45. Similarily, $\bar{Q}$ represents the logical inverse of the Q output of counter 45. The 12 $\bar{Q}$ leads are fed as input leads to 12 input NAND gate 49, whose output is fed as one of the inputs to 4 input AND gate 47. AND gate 47's output is connected to the down terminal of counter 45. When the count within counter 45 becomes a 0 all the Q wires contain a logical 0 and thus the $\bar{Q}$ wires each contain a logical 1. Therefore, the output of NAND gate 49 is a 0 and the output of AND gate 47 will be a 0, regardless of what the other inputs to AND gate 47 are, thus inhibiting the decrementing of counter 45.

The remaining new items shown on FIG. 6 constitute a multiple transition detection circuit useful in a very noisy environment. The noise can cause spurious zero crossings during the gating intervals. The circuit proceeds on the assumption that if there is more than one zero crossing during a combined early gate-late gate interval, all are spurious and therefore should not be counted. Counter 40 counts the number of zero crossings during each combined early gate-late gate interval. It is reinitialized at the beginning of every such interval by means of pulse Z, which is produced by pulse phase circuitry 80 as a pulse of brief duration occurring at the beginning of each early gate pulse (clock A for the single input stream embodiment) as shown in FIG. 4. The outputs of AND gates 35 and 36 are fed as inputs to OR gate 39, whose output is fed to the input of counter 40.

Counter 40 counts all the zero crossings during the interval, whether they be from the early gate or late gate. A mod 4 counter is selected for counter 40 because it is assumed that either the chances of getting four zero crossings during a combined gating interval are vanishingly small or else the environment is so noisy as to render the data quality virtually useless. $Q_1$ is the least significant bit stored in counter 40 and $Q_2$ is the most significant bit. $\bar{Q}_2$ is the logical inverse of $Q_2$. $Q_1$ and $\bar{Q}_2$ are fed as inputs to AND gate 41, whose output is an input to each of AND gates 46 and 47.

Thus, it is seen that if a single zero crossing has been registered by counter 40 during a particular early-late combined gating interval, a 1 will appear at the output of AND gate 41. If, on the other hand, 0, 2 or 3 zero crossings have been registered in counter 40 during that interval, the output of AND gate 41 will be a 0, which inhibits the production of output signals by both AND gates 46 and 47. Thus, those zero crossings which are assumed to be caused by noise will not register in counter 45.

Flip-flop 42 serves as a short term memory as follows: The output of AND gate 35 is also fed to the set input terminal of flip-flop 42 and the output of AND gate 36 is also fed as the input to the reset terminal of flip-flop 42. Flip-flop 42 works on the principle that if the last input signal reaching it came in over the set line, Q will be a logical 1 and $\bar{Q}$ will be a logical 0. If, on the other hand, the last signal reaching flip-flop 42 came in over the reset line, $\bar{Q}$ will be a 1 and Q will be a 0. Q is fed as an input to AND gate 46 and $\bar{Q}$ is fed as an input to AND gate 47. An additional pulse Y is generated after the completion of each combined gating interval by pulse circuitry 80, as shown in FIG. 4, and is fed as an input to each of AND gates 46 and 47. This constitutes a strobe or sampling instant for AND gates 46 and 47. If these AND gates have not been inhibited by AND gate 41 (or NAND gates 48 and 49), in other words, if there has been a single zero crossing during that interval, the operation of flip-flop 42 insures that 46 will register an up count if the zero crossing were in the early gate and 47 will register a down count if the zero crossing occurred during the late gate.

During testing of the invention, the recovered clock jitter was quite small, contributing no significant degradation to the error probability intrinsic to the signal. At high values of $E_b/N_o$ the jitter of the recovered clock reduced asymptotically to a minimum value determined by the data pattern induced phase jitter. This level is a function of the bit synchronizer loop band width or averaging time. In all cases examined, the asymptote was sufficiently low as to not contribute measurably to decision error probability.

The above description is included to illustrate the operation of the preferred embodiments and does not limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for synchronizing an input antipodal data bit stream having a bit period and having crossings about a reference axis, comprising:
   means for statistically estimating the mean crossing with respect to time of said input data stream;
   means for generating an early gate for each bit period whose on-duration is a predetermined percentage of said bit period, said early gate embracing crossings that occur just before said mean crossing and a late gate for each bit period whose on-duration is a predetermined percentage of said bit period, said late gate embracing crossings which occur just after said mean crossing; and
   means for changing the frequency of said gates in response to the frequency of said input data stream.

2. Apparatus of claim 1 further comprising means for inhibiting the counting of crossings when there is other than one crossing per combined early gate/late gate period, said inhibiting means comprising a modulo-four counter connected to said estimating means and to said generating means.

3. Apparatus of claim 1 wherein the widths of the early and late gates are each equal to 25% of the bit period of said input data stream.

4. Apparatus of claim 1 wherein said generating means comprises clock production means and two AND gates.

5. Apparatus of claim 1 wherein said frequency changing means comprises a digital/analog converter and a voltage controlled oscillator.

6. Apparatus of claim 1 wherein said estimating means comprises an up/down counter.

7. Apparatus of claim 6 further comprising means to prevent overflow within said counter.

8. Apparatus for synchronizing an input antipodal bit stream comprising:
   a sign sense amplifier connected to said stream;
   a pulse generator connected to said amplifier;
   two AND gates connected to said generator;
   an up/down counter connected to each of said AND gates;
   a digital/analog converter connected to said counter;
   a lead network connected to said converter;
   a voltage controlled oscillator connected to said network; and
   pulse shaping logic connected to said oscillator and to each of said AND gates, said logic creating pulses that are synchronized with said stream.

9. Apparatus for generating clock pulses at the same frequency as each of a plurality of synchronized input antipodal bit streams comprising:
   connected to each stream, means for generating a pulse whenever said stream changes from a low to a high condition and from a high to a low condition;
   connected to an output of each pulse generating means, an input of a first AND gate and an input of a second AND gate;
   wherein each of said first AND gates is ORed to the up terminal of an up/down counter and each of said second AND gates is ORed to the down terminal of said counter; and
   means for creating two clock signals per stream wherein said signals are fed to the AND gates associated with that stream and occur at the stream frequency.

* * * * *